United States Patent

[11] 3,600,504

[72] Inventor Edward J. Reilly
Mayfield Heights, Ohio
[21] Appl. No. 5,797
[22] Filed Jan. 26, 1970
[45] Patented Aug. 17, 1971
[73] Assignee Clevite Corporation

[54] FIELD SEQUENTIAL TO SIMULTANEOUS COLOR SIGNAL CONVERTER
9 Claims, 3 Drawing Figs.

[52] U.S. Cl. .......... 178/5.2 R, 178/5.4 C, 178/5.4 CD, 178/6.6 DD
[51] Int. Cl. .......... H04n 9/42
[50] Field of Search .......... 178/5.2 R, 5.4 R, 5.4 C, 5.4 RC, 6.6 DD, 5.4 CD

[56] References Cited

UNITED STATES PATENTS

| | | | |
|---|---|---|---|
| 3,506,775 | 4/1970 | McMann, Jr. | 178/5.4 C |
| 3,507,982 | 4/1970 | Sugihara | 178/5.4 C |
| 3,524,012 | 8/1970 | Kihara | 178/5.4 CD |

*Primary Examiner*—Robert L. Griffin
*Assistant Examiner*—George G. Stellar
*Attorney*—Eber J. Hyde

ABSTRACT: An endless track multitrack magnetic recorder-reproducer is employed as a sequential to simultaneous color TV signal converter. The scan of the television system and the displacement of the record medium of the recorder are synchronized so that the field scan rate and the repetition rate of the recorder are equal. The sequential color signal modulates a carrier which is switched sequentially to a record-reproduce head at each track in synchronism with the sequential change in color information. Thus each track periodically receives a new recording of signals corresponding to the color assigned to that track. A separate playback circuit including a demodulator is connected to each record-reproduce head. Each circuit delivers continuous signals corresponding to the color assigned to its track, first during recording and subsequently during playback until a new recording takes place. Each playback circuit includes means for attenuating the signal from the record amplifier, to which it is connected, during the time that recording is taking place at that head. Synchronization is simplified for closed circuit applications by driving the recorder-reproducer by a synchronous motor powered from the local AC power line, and generating horizontal sync signals for the TV system at the recorder-reproducer. A preferred form of sync generator is a light chopper mechanically coupled to the record medium.

INVENTOR.
EDWARD J. REILLY

BY

ATTORNEY

INVENTOR.
EDWARD J. REILLY

BY

ATTORNEY

FIELD SEQUENTIAL TO SIMULTANEOUS COLOR SIGNAL CONVERTER

BACKGROUND OF THE INVENTION

1. Field of the Invention

This invention relates to color television systems in which field sequential color signals are converted to simultaneous color signal by means of a magnetic recorder-reproducer. In particular, it relates to improvements in such converter, and means for maintaining synchronism between converter and system scanning. This system is particularly advantageous for closed circuit applications.

2. Description of the Prior Art

Commercial television in the U.S. employs simultaneous pickup of multicolor information. A typical camera employs three camera tubes. Each views the scene to be transmitted through a filter of different color. The three simultaneous color signals from the three tubes are combined and transmitted in a manner that permits their separation in the receiver. For a detailed description of the system reference may be made to a textbook such as "Principles of Color Television," edited by Knox Mcilwain and Charles E. Dean, and published by John Wiley and Sons, Inc., 1956.

Precise optical alignment and electrical matching of the three camera tubes are required. The cameras are large, heavy, and expensive. These objections inhibit the use of color in many closed circuit television applications.

Field sequential color cameras of the general type described by Goldmark, Dyer, Piore and Hollywood in Proceedings IRE, Volume 30, Pages 162—168, Apr. 1942, are potentially much less expensive, much smaller, and lighter. However, the signals produced by such cameras are not compatible with present color television transmission practice and therefore cannot be viewed on a typical color TV receiver. In the sequential system of Goldmark et al. a disc or drum carrying red, blue, and green filters rotates in the optical path of a monochrome camera and is synchronized with the scan system so that a full field is scanned successively in red, blue, and green.

Because of the potential advantages of the field sequential camera numerous attempts have been made to devise field sequential to simultaneous color signal converters. An example is the system employed by the National Aeronautics and Space Administration for color television transmission from the Apollo 10 spacecraft during its round trip to the moon. The camera in principle was similar to that described by Goldmark et al. The resulting field sequential color signals received from Apollo 10 were sequentially recorded on six magnetic tracks on a rotating magnetic disc. Signals for red, blue, and green fields each were assigned two tracks. Erasing and recording for each color signal took place alternately on the two tracks assigned to that color. Output circuits for each color were switched between heads at the tracks assigned to that color so that continuous playback of each color was obtained, playback always being taken from the track on which recording was not taking place. The magnetic disc servo drive was synchronized with the sequential color information by means of the sync pulses of the TV network. For further details reference may be made to an article in Electronics magazine, July 7, 1969, Pages 114 to 117, inclusive: "Color TV Wheel Takes a Spin in Space." This system employs a large number of magnetic heads, requires synchronous switching of six video input and six video output circuits; and requires an elaborate and expensive drive system for the magnetic disc to maintain satisfactory registration of color information in the picture reconstructed at the receiver.

SUMMARY OF THE INVENTION

An object of this invention is to provide a field sequential to simultaneous color TV signal converter employing a magnetic recorder-reproducer having a minimum number of magnetic heads.

Another object is to provide such a converter requiring a minimum number of synchronous video-switching circuits.

These objects are achieved by employing a magnetic recorder-reproducer having a combination record-reproduce head for each color represented by the field sequential color signal. Means are provided for moving the record medium to define an endless track for each head. The recorder and the field sequential signals are synchronized so that there is a one-for-one correspondence between sequential fields and recording cycles. Recording circuit means are connected to the record-reproduce heads to cause the field sequential signal to be recorded sequentially on the different tracks. Output circuit means are connected to each head so that an output signal is obtained at each circuit means directly from the recording circuit means during recording and by magnetic playback when recording is not taking place.

Another object of this invention is to provide a color TV system having a field sequential color signal source and a field sequential to simultaneous signal converter employing a magnetic recorder-reproducer in which the drive system for the recorder-reproducer is greatly simplified compared with the drives of prior art converters. This is accomplished by generating pulses at the converter corresponding to predetermined positions of the record medium and employing these pulses to control the line scanning of the TV system in accordance with occurrence of such pulses, rather than force the recorder to stay in synchronism with sync pulses obtained from the system.

DESCRIPTION OF THE PREFERRED EMBODIMENTS

Figure 1:
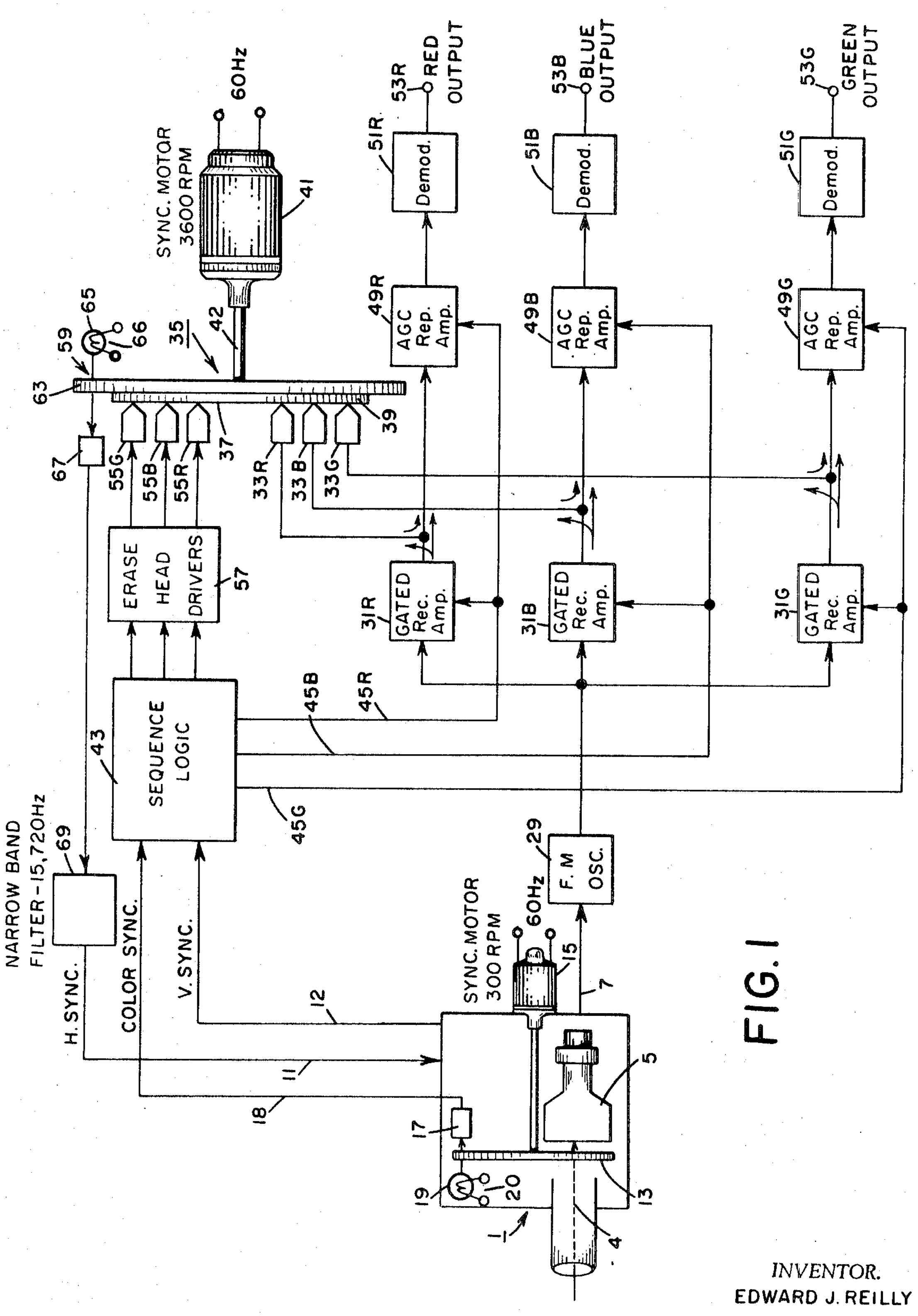
FIG. 1 is a block diagram of a color TV transmission system employing present invention.

Referring to FIG. 1, camera 1 delivers color video signals at line 7 in field sequential form at the rate of 60 fields per second.

Figure 3:
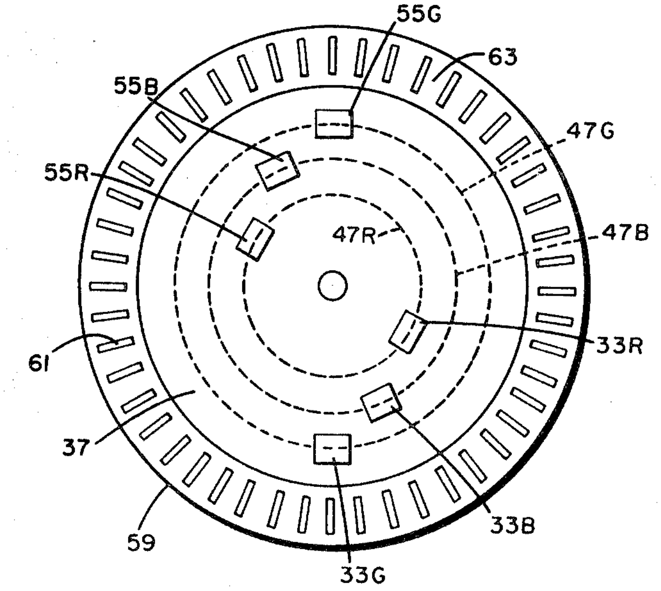
FIG. 3 is a diagrammatic plan view of the magnetic recording scan converter.

Magnetic recorder reproducer 35 has a magnetic record surface 37 on a disc 39. Three record-reproduce head 33R, 33B, 33G are supported in cooperative relation with record surface 37. The R, B, and G indicating red, blue, and green channels. Synchronous motor 41 rotates disc 39 to define with heads 33R, 33B, 33G three endless recording tracks 47R, 47B, 47G illustrated as dashed lines in FIG. 3. The speed of rotation of disc 39 is 60 revolutions per second, or 1 revolution per field scanned by camera 1.

The field sequential video signal from the camera, at line 7, is recorded sequentially on tracks 47R, 47B, 47G by means of beads 33R, 33B, 33G and gated record amplifiers 31R, 31B, 31G. Preferably, the video signal frequency modulates a high frequency oscillator 29, and the modulated high frequency is recorded.

Record amplifiers 31R, 31B, 31G are gated in sequence in synchronism with the color field information at line 7 by pulses on lines 45R, 45B, 45G, respectively, under the control of sequence logic at 43. The sequence logic is actuated by vertical sync pulses from the camera at line 12, and color sync pulses from the camera at line 18. Thus, during the time that the field sequential video signal at line 7 represents a red field, recording takes place on track 47R. During this time the recorder disc 39 executes one revolution. The next revolution of the recorder disc takes place in coincidence with the occurrence of blue field information, which is recorded at track 47B. Similarly, green field signals are recorded at track 47G during the next revolution of disc 39.

The input to playback or reproduce amplifier 49R is connected to head 33R, and also to the output of record amplifier 31R. The output of playback amplifier 49R is connected to demodulator 51R. Thus, during the time that red field information is being delivered to head 33R by record amplifier 31R, it also is being delivered to demodulator 51R through playback amplifier 49R. Therefore, during a recording cycle at head 33R, substantially the original red field signal appears at red output line 53R. During subsequent recording of blue field information at track 47B followed by recording of green field information at track 47G, the previous recording of red information at track 47R is magnetically reproduced through head 33R, playback amplifier 49R and demodulator 51R to repeat the red field information at red output 53R. Line 53R, therefore, carries continuous red field information, fields—2, 3,—5, 6,—8, 9,—11, 12—, etc., being reproductions of recorded fields 1, 4, 7, 10, etc. In like manner, line 53B carries continuous blue field signals, fields— 3, 4,—6, 7,—9, 10,—12, 13,—etc., being reproductions of recorded blue fields 2, 5, 8, 11, etc.

Also, in like manner, line 53G carries continuous green field signals, fields—4, 5,—7, 8,—10, 11,—13, 14,—etc., being reproduction of recorded green fields 3, 6, 9, 12, etc.

Playback amplifier 49R receives and must amplify millivolt signals from head 33R during playback cycles from track 47R but is subjected to input of many volts from record amplifier 31R during the recording cycle at track 47R. Similarly, amplifiers 49B and 49G must amplify millivolt signals but are subjected to signals of many volts. To accommodate this wide range of signals the playback amplifiers are equipped with automatic gain control (AGC) circuits which are actuated by the same pulses at line 45R, 45B, 45G, which sequentially turn on record amplifiers 31. Thus, during recording at head 33R, for example, playback amplifier 49R has reduced gain.

The simple, direct connection between outputs of record amplifier 31 and input of corresponding playback amplifiers 49 illustrated in FIG. 1 may be replaced by other arrangements functioning to deliver signal to a playback amplifier during recording. For example, each head 33 could be provided with two windings, one connected to a record amplifier output and the other connected to a playback amplifier input. In this case, during recording at one head the signal being recorded is simultaneously delivered to the input of the playback amplifier connected to that head by transformer action in the head.

Erase heads 55R, 55B, 55G are energized sequentially by erase head driver 57 under control of sequence logic 43. Erasing at each head takes place after the second playback from the corresponding record head so that in each case the track is clear for the next recording.

Returning now to camera 1, very satisfactory results have been obtained by modifying a General Electric Model TE 21 camera as described below. This is a monochrome camera intended for closed circuit applications and contains all necessary electronics for generating composite sync pulses and adding them to the video signal for the closed circuit television system. Prior to modifications to the camera described below, the signal output at line 7 was suitable, without further processing, for connection to a home-entertainment-type television receiver, the connection being made to the video amplifier of the receiver. Alternatively, the output from line 7 could modulate a VHF or UHF carrier of suitable frequency which then could be fed into the antenna terminals of the receiver.

The original camera was modified by installing a color heel 13 to rotate in the optical path 4 of the camera tube 5. The wheel is shown in greater detail in FIG. 2. There are four red filters 21R, four blue filters 21B, and four green filters 21G, separated by opaque areas 27. The color wheel 13 is driven at 5 revolutions per second b synchronous motor 15 operated from the 60 Hz. line. Thus, the camera tube 5 sequentially views the object field being scanned through filters of each of the three colors, for a total of 60 fields per second and, therefore, the output at line 7 becomes a field sequential color signal.

The camera tube is a General Electric Vidicon type GL8541. Such tubes have substantial lag in their operation so that a signal may be obtained after the image input is removed. The opaque areas 27 in the color wheel 13 are provided to prevent superposition of a new image of a second color on a stored image of a first color.

I have found that with typical Vidicons, such as the General Electric GL8541, the optimum ratio of color area to dark area is about 30 percent color to 70 percent opaque and I have found it advantageous to scan the stored image only.

If a camera tube with very low lag is used the color areas may be increased to approach 100 percent. Representative of such camera tubes is the Ampex-type CCTV111 which has a lead oxide target.

Figure 2:
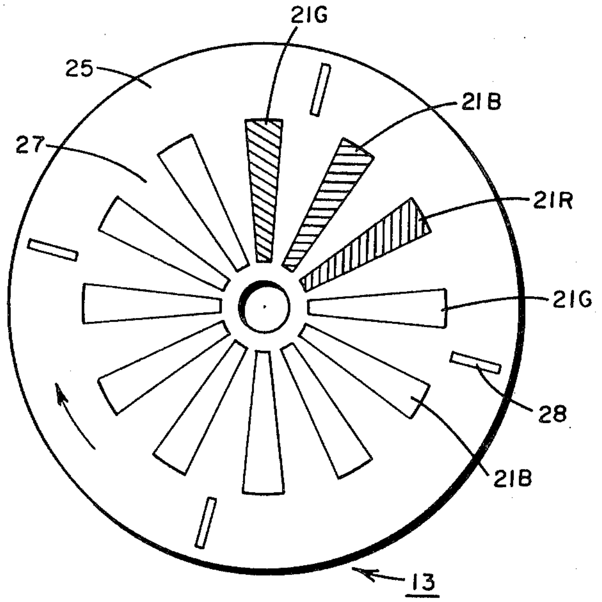
FIG. 2 is a diagrammatic plan view of the color wheel used in the camera.

Within the camera, adjacent to the rim of color wheel 13 a light source 19 was installed and operated on direct current supplied to terminals 20. Suitable light shielding, not shown, as provided to prevent stray light from falling on camera tube 5. A phototransistor 17 was aligned with light source 19 on the opposite side of the color wheel. Referring to FIG. 2, the opaque rim 25 of color wheel 13 has four rectangular optical aperture 28 at 90° intervals. In the camera, rim 25 intercepts the light from source 19 preventing it from energizing phototransistor 17 except when an aperture 28 is in alignment with light source 19 and phototransistor 17. Thus, as the disc 13 rotates at 5 revolutions per second, 20 pulses per second are generated by phototransistor 17.

The pulses from phototransistor 17, connected to sequence logic 43 by line 18, coact with the vertical sync pulses delivered from camera 1 over line 12 to insure that appropriate record amplifier 31 is gated "on" during the time that corresponding color field information is delivered by camera 1 to line 7.

Minor modifications also were made in the electronic circuits within the camera:

a. The horizontal sync circuit in the camera was disabled and the 15,750 Hz. horizontal scan multivibrator was coupled to line 11 carrying 15,720 Hz. signal from the pulse generator at the recorder-reproducer 35. Thus the horizontal scan is synchronized with the recorder-reproducer.

b. Line 12 as added for supplying vertical sync pulses from the camera 1 to sequence logic unit 43.

Referring now to the pulse generator at the recorder-reproducer 35, a plurality of rectangular optical aperture 61 are evenly disposed around opaque rim 63 which surrounds magnetic coating 37 to form a light chopper 59. On opposite sides of the opaque rim 63 of the light chopper 59 are a light source 65 supplied with DC at terminal 66 and a phototransistor 67. Opaque portions 63 prevent light source 65 from actuating phototransistor 67. The chopper has 262 apertures 61, each of which allows light to fall on 67 when in alignment therewith. Thus, 262 pulses are generated, corresponding to predetermined positions of record medium 37, for each revolution of the disc of the recorder-reproducer 35. For convenience in manufacture, light chopper 59 may be formed as a separate disc or ring which then is attached to disc 39 or to drive shaft 42. However, they may, if desired, be combined into a single disc.

The pulses from 67 are filtered by a narrow band filter 69 which may be a high Q tuned circuit or a synchronized oscillator tuned to 15,720 Hz. which is the fundamental frequency of the pulses. This filter helps overcome the effects of inaccuracies in constructing the light chopper.

The filtered signal is applied over line 11 to control the horizontal scan of the camera. I have found that deriving the horizontal sync pulses from a pulse generator coupled to the recorder-reproducer rather than from an oscillator synced with the 60 Hz. line, gives very superior results as it tends to compensate for short term irregularities in the motion of the recorder-reproducer.

The red, blue, and green field output signals at lines 53R, 53B, 53G, respectively, may be combined in an NTSC-type color signal encoder to produce a signal suitable for actuating a home-entertainment-type color television receiver via the video amplifier thereof. The only synchronizing information that must be added at the encoder is the color burst, the other sync signals having been added at camera 1.

The composite signal departs from standard broadcast practice, as discussed below, but produces very satisfactory results for closed circuit applications.

Since the horizontal synchronizing pulses are derived from the pulse generator at recorder-reproducer 35, they cannot by synchronized with the 3,579,545 Hz. color subcarrier. I have found that the interference that may be generated due to this lack of synchronism is not objectionable when the viewing is limited to color TV receivers.

For simplicity and economy, interlace is not employed and accordingly the system generates 262 scan lines per field rather than the conventional broadcast practice of 262—one-half lines per field.

Although a specific embodiment of my invention has been described it will be apparent to those skilled in the art that many variations may be made within the scope of the appended claims.

What I claim is:

1. A field sequential to simultaneous color TV signal converter for use in a color TV system and adapted to receive field sequential color output signals and to deliver simultaneous color output signals comprising:

a magnetic recorder-reproducer having a. a magnetic record medium;

b. a plurality of combination record-reproduce magnetic heads, each identified with a color represented in said sequential color signals for recording on said record medium;

c. means for causing displacement of said record medium past said record-reproduce heads to define an endless record track for each head; means for synchronizing said record medium with said field sequential color signals so that there is a one-for-one correspondence between sequential fields and recording cycles;

input circuit means connected to said heads adapted to cause recording at each head sequentially the portion of said field sequential color signals bearing color information corresponding to the color identified with said head; and a plurality of output circuit means each connected to a different one of said magnetic heads at its input connection and adapted to deliver said simultaneous color output signals corresponding substantially to the sequentially produced color signal recorded at each of said heads during recording thereby, and during subsequent reproduction therefrom.

2. A field sequential to simultaneous color TV signal converter as described in claim 1 in which each of the output circuit means includes means for attenuating the output signal during the time that recording is taking place at the record-reproduce head to which said output means is connected.

3. A field sequential to simultaneous color TV signal converter as described in claim 1 in which the input circuit mean includes an oscillator having an output and means to frequency modulate said oscillator output by the field sequential signal supplied thereto, and each output circuit means includes a demodulator.

4. A field sequential to simultaneous color TV signal converter as described in claim 1 in which said magnetic recorder-reproducer has an erase head for each record track and comprises circuit means connected to said erase heads and adapted to cause erasing of each track after the final playback and prior to the next recording cycle thereon.

5. A field sequential to simultaneous color TV signal converter as described in claim 1 in which said synchronizing means is coupled to said record medium for controlling the horizontal scan of said TV system corresponding to predetermined positions of said record medium.

6. A field sequential to simultaneous color TV signal converter as described in claim 5 in which said synchronizing means comprises a light chopper for generating sync pulses.

7. A field sequential to simultaneous color TV signal converter as described in claim 6 in which the record medium is supported on the surface of a rotatable disc and said means for generating sync pulses comprises a light source and a light sensitive device in alignment parallel to the axis of rotation of said disc and separated by a rim portion of said disc, said rim portion having a plurality of light apertures and opaque portions for causing interrupted illumination of said light sensitive device.

8. A field sequential to simultaneous color TV signal converter as described in claim 7 in which the TV system operates at 60 fields per second, the record medium rotates at 60 revolutions per second, and the light apertures number 262.

9. A color TV system comprising:

a. a camera producing field sequential color signals comprising:

1. a single camera tube,
2. vertical and horizontal scan means for scanning the face of said tube,
3. a source of vertical synchronizing pulses,
4. a color filter wheel having a rim, and means for rotating said wheel in synchronism with the vertical scanning frequency so that the camera tube is exposed to only one color per vertical scan,
5. A light source and light-sensitive device on opposite sides of said rim,
6. apertures in said rim so located that said light-sensitive device produces a color synchronizing pulse for each complete sequence of different color exposures of said camera tube;

b. a field sequential signal to simultaneous signal converter comprising:

1. a magnetic recorder-reproducer having a magnetic record disc, a plurality of combination record-reproduce magnetic heads, each identified with a color represented in the sequential color signals for recording on said record disc, and means signals causing rotation of said record disc about its axis past sad record-reproduce heads to define an endless record track for each head, and means for synchronizing said disc with said field sequential color signals so that said disc executes 1 revolution per sequential field,
2. a light source and a light-sensitive device in alignment parallel to the axis of rotation of said disc and separated by a rim portion of said disc, said rim portion having a plurality of light apertures and opaque portions for causing interrupted illumination of said light sensitive device to produce horizontal synchronizing pulse for said horizontal scan means,
3. an oscillator having an output and means to frequency modulate said oscillator output by said field sequential signals supplied thereto,
4. a plurality of gated record amplifiers each having an output connected to a different one of aid record-reproduce heads and having a common input connected to the output of said oscillator means,
5. a plurality of AGC reproduce amplifiers, each having an input connected to a different one of said record-reproduce heads,
6. a plurality of demodulators, each connected to an output of a different one of said reproduce amplifiers,
7. sequence means connected to said gated record amplifiers and to said AGC reproduce amplifiers, and controlled by said vertical sync pulses and said color sync pulses from the camera to cause recording at each record reproduce head sequentially the portion of said field sequential color signals bearing color information corresponding to the color identified with said head, and to sequentially reduce the gain of each AGC reproduce amplifier as the head to which such amplifier is connected is supplied with record signal from a gated record amplifier.